(12) United States Patent
Kuan-Ting et al.

(10) Patent No.: US 7,788,557 B2
(45) Date of Patent: Aug. 31, 2010

(54) BASEBOARD TESTING INTERFACE AND TESTING METHOD THEREOF

(75) Inventors: Chen Kuan-Ting, Taipei (TW); Tsai Ming-Sheng, Taipei (TW); Teng Shu-Hsuan, Taipei (TW); Ling Kuo-Chun, Taipei (TW)

(73) Assignee: Compal Electronics, Inc., Taipei (TW)

( * ) Notice: Subject to any disclaimer, the term of this patent is extended or adjusted under 35 U.S.C. 154(b) by 671 days.

(21) Appl. No.: 11/732,947

(22) Filed: Apr. 5, 2007

(65) Prior Publication Data

US 2008/0040632 A1 Feb. 14, 2008

(30) Foreign Application Priority Data

May 24, 2006 (TW) .............................. 95118409 A

(51) Int. Cl.
*G01R 31/28* (2006.01)
*G11C 29/00* (2006.01)
*G01R 31/26* (2006.01)

(52) U.S. Cl. .................. 714/724; 324/765; 365/201

(58) Field of Classification Search ........................ None
See application file for complete search history.

(56) References Cited

U.S. PATENT DOCUMENTS

| | | | | |
|---|---|---|---|---|
| 5,659,680 A * | 8/1997 | Cunningham et al. | ......... | 714/25 |
| 5,815,647 A * | 9/1998 | Buckland et al. | ............... | 714/3 |
| 6,108,730 A * | 8/2000 | Dell et al. | .................... | 710/301 |
| 6,351,827 B1 * | 2/2002 | Co et al. | ....................... | 714/42 |
| 7,480,582 B2 * | 1/2009 | Chen | .......................... | 702/117 |
| 2004/0010773 A1 * | 1/2004 | Chan et al. | .................. | 717/104 |
| 2005/0193274 A1 * | 9/2005 | Aoki et al. | ..................... | 714/42 |
| 2006/0080078 A1 * | 4/2006 | Wang et al. | .................. | 703/26 |
| 2007/0244661 A1 * | 10/2007 | Cannon et al. | ............. | 702/117 |
| 2008/0091980 A1 * | 4/2008 | Grimes et al. | ................. | 714/43 |

* cited by examiner

*Primary Examiner*—Kevin L Ellis
*Assistant Examiner*—Guerrier Merant
(74) *Attorney, Agent, or Firm*—Ming Chow; Sinorica, LLC

(57) ABSTRACT

The present invention relates to a baseboard testing interface, which comprises: a baseboard, on which a plurality of first electronic components, a plurality of signal lines, and a first connection interface are configured, and the first electronic components are coupled to the signal lines; a slot disposed on the baseboard for an external interface adapter to plug in; and a debugging adapter that is plugged into the slot, and a plurality of second electronic components and a second connection interface are configured thereon; when the debugging adapter is plugged into the slot and fixed on the baseboard, the second connection interface is contacted with the first connection interface, such that the signals can be transmitted between the baseboard and the debugging adapter. In addition, the present invention further provides a baseboard testing method.

19 Claims, 6 Drawing Sheets

BASEBOARD TESTING INTERFACE AND TESTING METHOD THEREOF

BACKGROUND OF THE INVENTION

1. Field of the Invention

The present invention relates to a baseboard testing interface and a testing method thereof, and more particularly, to a baseboard testing interface, on which a first connection interface is configured on a motherboard, and a second connection interface is configured on a debugging adapter, such that when the debugging adapter is slantly plugged into a memory slot of the motherboard, the second connection interface is contacted with the first connection interface in order to transmit the signals between the baseboard and the debugging adapter, and a testing method thereof.

2. Description of the Related Art

Currently, in the computer motherboard testing device, a debugging adapter with the testing and display functions is plugged into a motherboard's slot, e.g. an ISA slot or a PCI slot, to perform the testing and debugging functions on the motherboard.

A PCI debugging device used on the PCI interface of the computer motherboards had been disclosed in the "PCI Debugging Device, Debugging Method, Chipset and System Applying the Same" in the approved R.O.C. Patent No. 508490 (applied on Aug. 27, 1999 and published on Nov. 1, 2002). The approved patent comprises a PCI debugging device for debugging a system with a PCI interface. Wherein, the PCI interface comprises a request signal, a permission signal and an object ready signal, and the system has a debugging mode. When the system is on the debugging mode and the request signal is activated, the permission signal will not be terminated by the system. The PCI debugging device comprises: a switch circuit for setting up a to-be-debugged command signal; a system data display circuit, which is coupled to the PCI interface for displaying the data on the PCI interface and issuing a real-time command signal; a decoding comparator circuit, which is coupled to the switch circuit and the system data display circuit for decoding the real-time command signal and comparing with the to-be-debugged command signal in order to generate a same-command instruction signal; and a latch circuit with a reset input, which is coupled to the decoding comparator circuit for latching a trigger signal, so as to activate the request signal.

It is quite inconvenient when applying the PCI interface debugging adapter mentioned above on the motherboard of the notebook computers. It is because the general notebook computers are quite small, when it is required to plug in the PCI interface debugging adapter to the PCI slot to perform the testing function, the notebook computer's cover has to be removed first. Accordingly, it inevitably increases the operation's difficulty.

SUMMARY OF THE INVENTION

Therefore, it is an objective of the present invention to provide a baseboard testing interface and a testing method thereof. In the present invention, the debugging adapter is fixed on the memory slot on the motherboard, and the required electricity power and the ground signal are provided through the memory slot, such that the maintenance staff only needs to remove the cover of the memory slot to repair the notebook computer.

It is another objective of the present invention to provide a baseboard testing interface and a testing method thereof. In the present invention, a first connection interface is configured on a motherboard, and a second interface connection interface is configured on a debugging adapter. When the debugging adapter is slantly plugged into a memory slot of the motherboard, the second connection interface is contacted with the first connection interface, such that the signals can be transmitted between the baseboard and the debugging adapter.

To achieve the foregoing objectives, the present invention provides a baseboard testing interface, which comprises: a baseboard, on which a plurality of first electronic components, a plurality of signal lines, and a first connection interface are configured, and the first electronic components are coupled to the signal lines; a slot disposed on the baseboard for an external interface adapter to plug in; and a debugging adapter that is plugged into the slot, and a plurality of second electronic components and a second connection interface are configured thereon; when the debugging adapter is plugged into the slot and fixed on the baseboard, the second connection interface is contacted with the first connection interface, such that the signals can be transmitted between the baseboard and the debugging adapter. In addition, the present invention further provides a baseboard testing method.

To achieve the foregoing objectives, the present invention provides a baseboard testing interface, which comprises: a first baseboard, on which a plurality of first electronic components, a plurality of signal lines, and a first connection interface are configured, and the first electronic components are coupled to the signal lines; a slot disposed on the baseboard for an external interface adapter to plug in; a second baseboard, which is plugged into the slot, and a first connector, a second connector, and a second connection interface are configured thereon; and a debugging adapter, which comprises a plurality of second electronic components, a plurality of signal lines, and a third connector that is coupled to the second connector through a signal line. When the second baseboard is plugged into the slot and fixed on the first baseboard, the second connection interface is contacted with the first connection interface. Afterwards, the debugging adapter is coupled to the second connector, such that the signals can be transmitted among the first baseboard, the second baseboard, and the debugging adapter.

To achieve the foregoing objectives, the present invention provides a baseboard testing method. Wherein, the baseboard comprises a slot, and the testing method comprises the following steps: configuring a first connection interface on a position near to the slot on the baseboard; providing a debugging adapter, on which a plurality of electronic components and a second connection interface are configured; slantly plugging the debugging adapter into the slot, such that the second connection interface is contacted with the first connection interface, and the signals can be transmitted between the baseboard and the debugging adapter; and the electronic component decoding the signal to generate a message code, and displaying the message code.

BRIEF DESCRIPTION DRAWINGS

The accompanying drawings are included to provide a further comprehending of the invention, and are incorporated in and constitute a portion of this specification. The drawings illustrate embodiments of the invention, and together with the description, serve to explain the principles of the invention.

DESCRIPTION PREFERRED EMBODIMENTS

Figure 1:
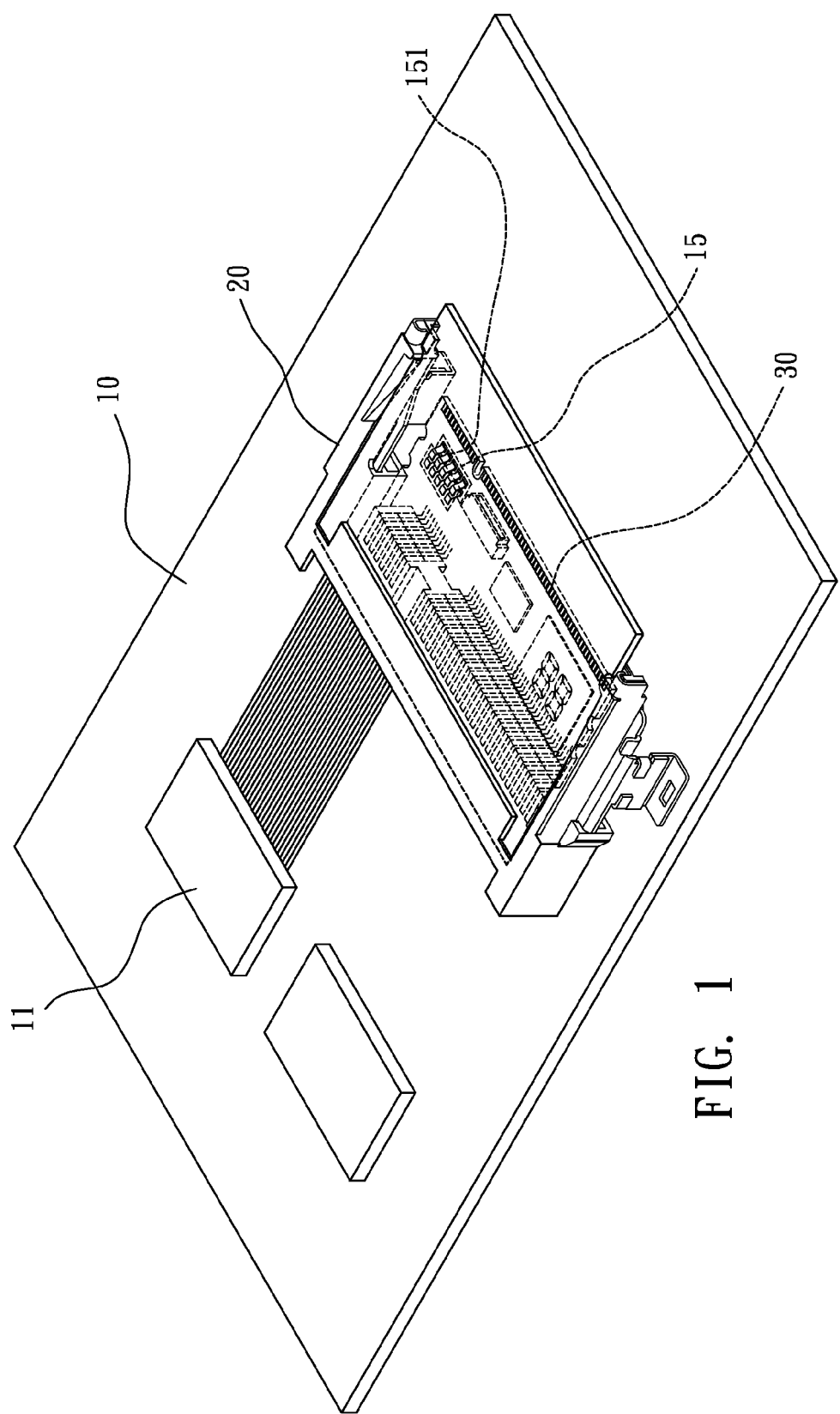
FIG. 1 is a schematic diagram showing a baseboard and a slot of a baseboard testing interface according to a preferred embodiment of the present invention.
Figure 2A:
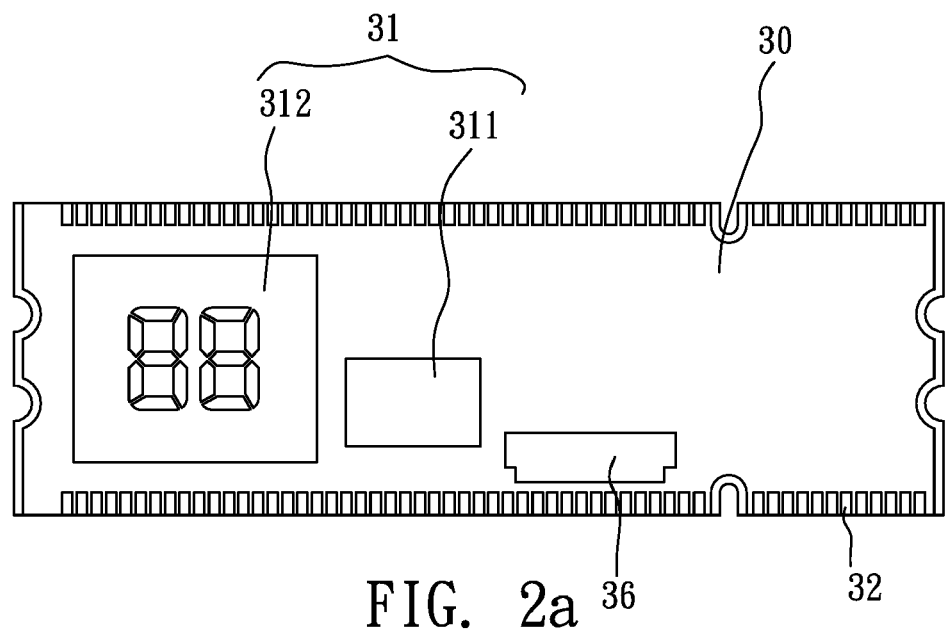
FIG. 2(a) is a front view of a debugging adapter according to a preferred embodiment of the present invention.
Figure 2B:
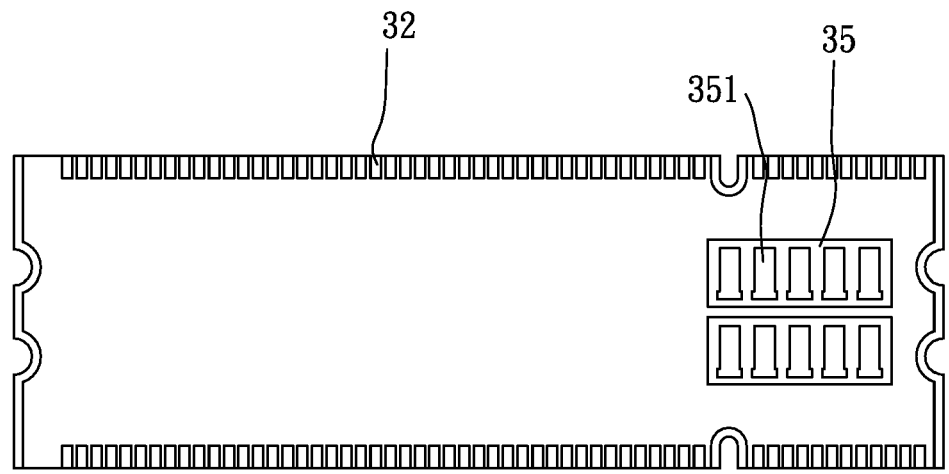
FIG. 2(b) is a back view of a debugging adapter according to a preferred embodiment of the present invention.

Referring to FIGS. 1, 2(a) and 2(b), wherein FIG. 1 is a schematic diagram showing a baseboard and a slot of a baseboard testing interface according to a preferred embodiment of the present invention; FIG. 2(a) is a front view of a debugging adapter according to a preferred embodiment of the present invention; and FIG. 2(b) is a back view of a debugging adapter according to a preferred embodiment of the present invention. As shown in the drawings, the baseboard testing interface provided by the present invention may be used to test, for example, a circuit board of a notebook computer or a desktop computer, wherein the circuit board is, including but not necessarily limited to a motherboard. The baseboard testing interface of the present invention at least comprises a baseboard 10, a slot 20, and a debugging adapter 30.

Wherein, the baseboard 10 is, including but not necessarily limited to a motherboard of a notebook computer or a desktop computer. In addition, a plurality of first electronic components 11 (including but not necessarily limited to a southbridge/northbrige chipset, a LAN (Local Area Network) controller or a Graphics controller, etc), a plurality of signal lines (not shown), and a first connection interface 15 are configured on the baseboard 10. The first electronic components 11 are coupled to the signal lines, and some of the first electronic components 11 are coupled to the first connection interface 15 through the signal lines. Wherein, the first connection interface 15 comprises a plurality of contacts 151, which are directly formed on the baseboard 10. Ten contacts are exemplified in the present embodiment for easy explanation in order to respectively represent the PCLK_PCI_SIO, LPC_AD0, LPC_AD1, LPC_AD2, LPC_AD3, LPC_FRAME#, PCIRST#, LPC_DRQ1#/E51_RXD, SERIRQ/E51_RDX, and +3VALW signals, but they are not necessarily limited to be ten contacts. When the contacts 151 are used to bind the debugging adapter 30 with the baseboard 10, the debugging adapter 30 is vertically mapped onto an area of the baseboard 10, and the first electronic components 11 are configured on a surface vertical to the baseboard 10.

The slot 20 is disposed on the baseboard 10 for an external interface adapter to plug in, wherein the external interface adapter is, including but not necessarily limited to a memory adapter or a display adapter. In the present embodiment, the slot 20 is a S0-DIMM memory adapter slot on the baseboard 10 and is built in the shape of "Π". In addition, an elastic long-shaped fixed latch and a plurality of elastic metal pins (not shown in the diagram and since these techniques are known in the prior art, its detail is intentionally omitted herein) are configured on both sides of the slot 20, such that the debugging adapter 30 can be fixed on the "Π"shaped slot 20. Additionally, the first connection interface 11 is preferably disposed on the baseboard 10 within the range of the "Π"shaped slot 20.

The debugging adapter 30 can be plugged into the slot 20, and a plurality of second electronic components 31 and a second connection interface 35 are further configured thereon. Wherein, the second electronic components 31 further comprise a decoding chip 311 and a display device 312. The decoding chip 311 is coupled to the second connection interface 35 and the display device 312. The decoding chip 311 receives a signal on the baseboard 10 through the second connection interface 35. Then, the received signal is decoded by the decoding chip 311 based on the Intel Low Pin Count Interface Specification to generate a message code, which is subsequently displayed by the display device 312. Here, the display device 312 is, including but not necessarily limited to a seven-segment LED display.

The second connection interface 35 is disposed on another side where the second electronic components 31 are not installed thereon and is opposite to the first connection interface 15, such that the second connection interface 35 can be contacted with the first connection interface 15. In the present embodiment, the second connection interface 35 may be implemented, including but not necessarily limited by an elastic slice connector, which comprises a plurality of elastic slices 351, and the amount of elastic slices 351 is equal to the amount of contacts 151.

In addition, one side of the debugging adapter 30 further comprises a plurality of goldenfinger pins 32, which can obtain the electricity power and the ground signal from the baseboard 10 through the slot 20.

The debugging adapter 30 further comprises a connector 36, such that the debugging adapter 30 can be connected to a second baseboard through a signal connection line, wherein the signal connection line may be a ribbon cable.

Figure 3:
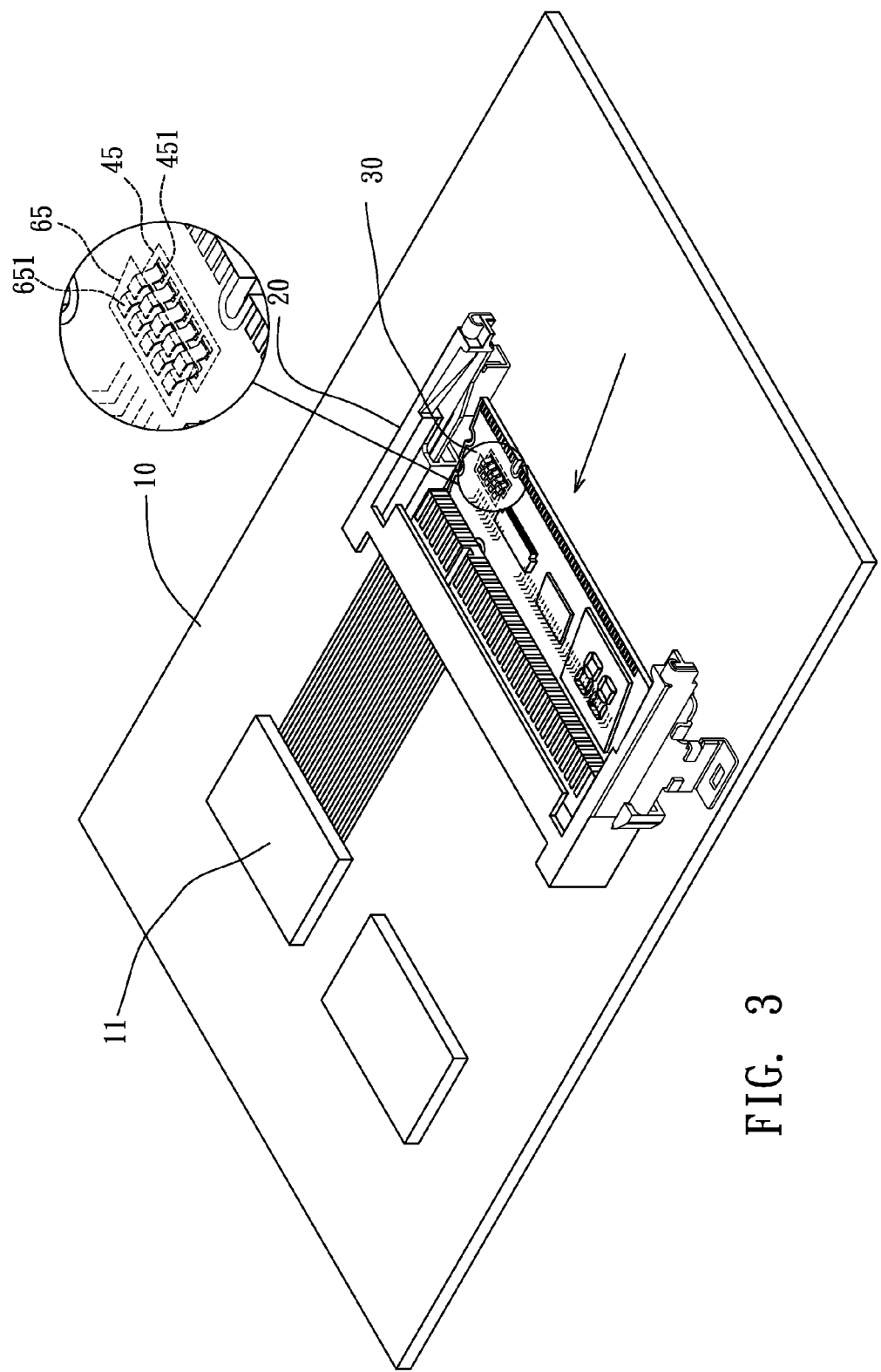
FIG. 3 is a schematically diagram showing the debugging adapter of the present invention that had been plugged into the slot.

FIG. 3 is a schematically diagram showing the debugging adapter 30 of the present invention that had been plugged into the slot 20. As shown in the drawing, while being assembled, first the debugging adapter 30 is plugged into the slot 20 with a 45° inclined angle. Then, a downward pressure is applied to clip and fix the debugging adapter 30 on the baseboard 10 by using a plurality of elastic metal pins in the slot 20 and the elastic long-shaped fixed latch that are disposed on both sides of the slot 20, such that the second connection interface 35 on the debugging adapter 30 is coupled with the plurality of contacts 151 on the baseboard 10. Meanwhile, the signals can be transmitted between the baseboard 10 and the debugging adapter 30. The decoding chip 311 on the debugging adapter 30 is designed according to the Intel Low Pin Count Interface Specification. The signals on the baseboard 10 are decoded by the decoding chip 311 in order to generate a message code, which is subsequently displayed by the display device 312. Then, after looking up the message code from the Intel Error Code List, the developers and the customer service engineers can comprehend whether the baseboard 10 is out of order and decide whether to fix it or not. Accordingly, the present invention effectively resolves the disadvantages of the conventional PCI or ISA slot debugging adapter. In addition, unlike in the conventional technique, the cover of the notebook computer has to be taken apart before the debugging adapter can be plugged into the PCI slot. When using the baseboard testing interface of the present invention to test the notebook computer's baseboard, as long as the cover of the memory slot is removed, the developers and the customer service engineers can plug the debugging adapter 30 into the slot 20 to check the status. Accordingly, the present invention is more advanced.

Figure 4:
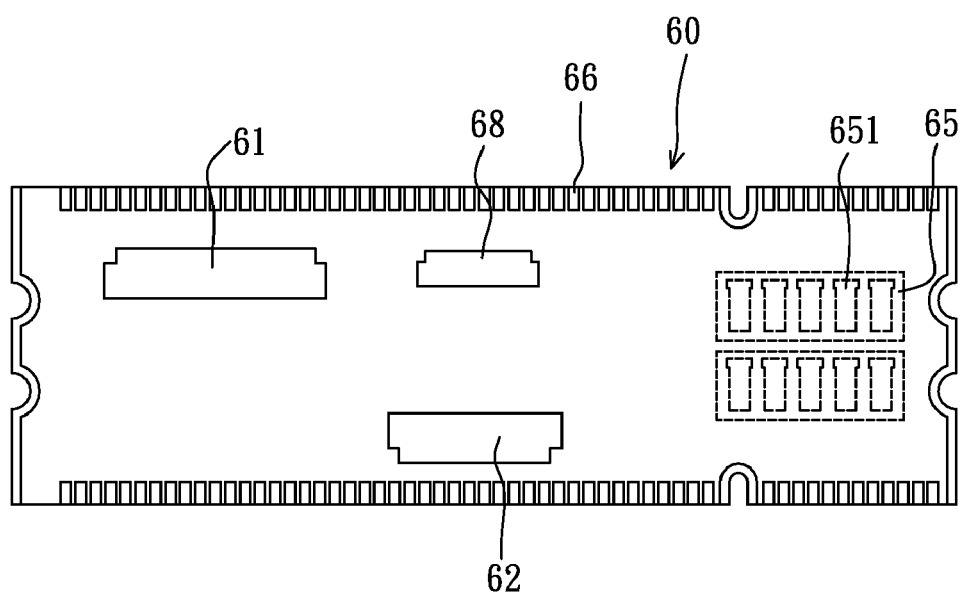
FIG. 4 is a schematic diagram showing a baseboard testing interface according to another preferred embodiment of the present invention.

FIG. 4 is a schematic diagram showing a baseboard testing interface according to another preferred embodiment of the present invention. As shown in the drawing, the baseboard testing interface according to another preferred embodiment of the present invention at least comprises a first baseboard 40, a slot 50, a second baseboard 60, and a debugging adapter 70. The difference between the present embodiment and the pervious embodiment is described as follows. In the previous embodiment, if there is a memory adapter or another external interface adapter in the slot 20 on the baseboard 10, since the space inside the slot 20 is insufficient and the parts-interference problem may occur, it is not possible to plug the debugging adapter that has more parts and if the parts are longer into the slot 20 on the baseboard 10. Therefore, in the present embodiment, a second baseboard 60 in which the amount of parts is less than the debugging adapter and the part's height is lower than the debugging adapter is plugged into the slot 50 on the first baseboard 40, so as to effectively resolve the previous embodiment's problem.

Wherein, the first baseboard 40 is, including but not necessarily limited to a motherboard of a notebook computer or a desktop computer. In addition, a plurality of first electronic components 41 (including but not necessarily limited to a southbridge/northbrige chipset, a LAN (Local Area Network) controller or a Graphics controller, etc), a plurality of signal lines, and a first connection interface 45 are configured on the first baseboard 40. The first electronic components 41 are coupled to the signal lines. Wherein, the first connection interface 45 comprises a plurality of contacts 451, which are directly formed on the first baseboard 40. Ten contacts are exemplified in the present embodiment for easy explanation in order to respectively represent the PCLK_PCI_SIO, LPC_AD0, LPC_AD1, LPC_AD2, LPC_AD3, LPC_FRAME#, PCIRST#, LPC_DRQ1#/E51_RXD, SERIRQ/E51_RDX, and +3VALW signals, but they are not necessarily limited to be ten contacts. When the contacts 451 are used to bind the debugging adapter 70 with the second baseboard 60, the second baseboard 60 is vertically mapped onto an area of the first baseboard 40, and the first electronic components 41 are configured on a surface vertical to the first baseboard 40.

The slot 50 is disposed on the baseboard 40 for an external interface adapter to plug in, wherein the external interface adapter is, including but not limited to a memory adapter or a display adapter. In the present embodiment, the slot 50 is a S0-DIMM memory adapter slot on the baseboard 40 and is built in the shape of "Π". In addition, an elastic long-shaped fixed latch and a plurality of elastic metal pins (not shown in the diagram and since these techniques are known in the prior art, its detail is intentionally omitted herein) are configured on both sides of the slot 50, such that the debugging adapter 70 can be fixed on the "Π"shaped slot 50. Additionally, the first connection interface 41 is preferably disposed on the baseboard 40 within the range of the "Π"shaped slot 50.

The second baseboard 60 can be plugged into the slot 50, and a first connector 61, a second connector 62, and a second connection interface 65 are configured thereon. Wherein, the first connector 61 is a SUPER I/O connector, and the second connector 62 is coupled to the debugging adapter 70 through a signal connection line 67, so as to transmit the PCLK_PCI_SIO, LPC_AD0, LPC_AD1, LPC_AD2, LPC_AD3, LPC_FRAME#, PCIRST#, LPC_DRQ1#/E51_RXD, SERIRQ/E51_RDX, and +3VALW signals to the debugging adapter 70. In addition, a plurality of goldenfinger pins 66 is further configured on one side of the second baseboard 60, so as to obtain the electricity power and the ground signal from the baseboard 40 through the slot 50. The second baseboard 60 further comprises a fourth connector 68 for connecting to a keyboard (not shown), such that the state of a keyboard controller (not shown) can be transmitted to the debugging adapter 70 to test the keyboard's state.

The second connection interface 65 is disposed on the second baseboard 60. The second connection interface 65 may be an elastic connector, which comprises a plurality of elastic slices 651, and the amount of elastic slices 651 is equal to the amount of contacts 451.

The debugging adapter 70 comprises a plurality of second electronic components 71, a plurality of signal lines (not shown), and a third connector 72. The third connector 72 is coupled to the second connector 62 through the signal connection line 67 to receive the PCLK_PCI_SIO, LPC_AD0, LPC_AD1, LPC_AD2, LPC_AD3, LPC_FRAME#, PCIRST#, LPC_DRQ1#/E51_RXD, SERIRQ/E51_RDX, and +3VALW signals. Wherein, the second electronic component 71 further comprises a decoding chip 712 and a display device 711. The decoding chip 712 is coupled to the third connector 72 and the display device 711. The decoding chip 712 receives a signal on the baseboard 40 through the third connector 72. Then, the received signal is decoded by the decoding chip 712 based on the Intel Low Pin Count Interface Specification to generate a message code, which is subsequently displayed by the display device 711. Here, the display device 711 is, including but not necessarily limited to a seven-segment LED display.

Figure 5:
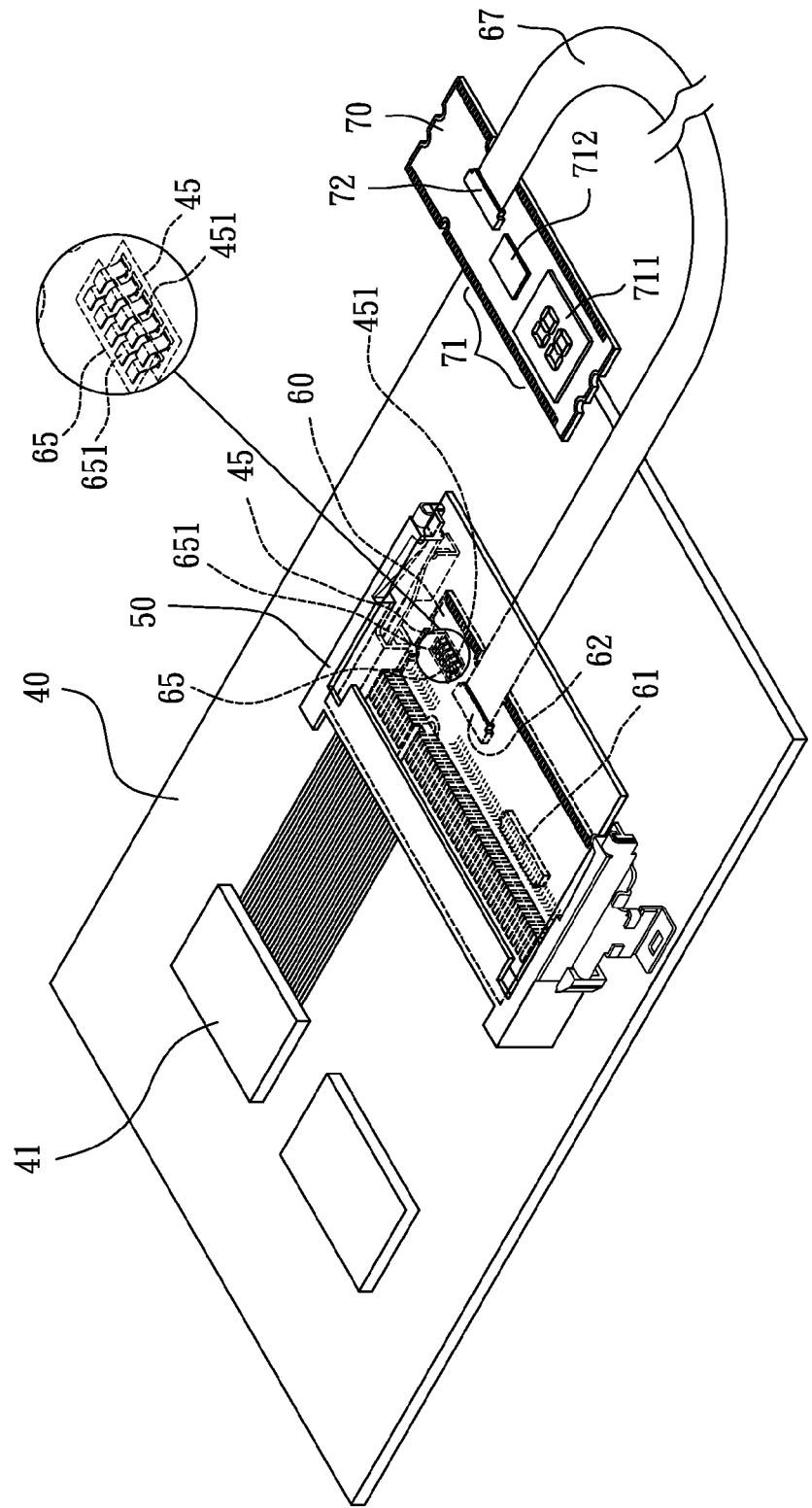
FIG. 5 is a schematic diagram showing the connection of the baseboard testing interface of the present invention.

FIG. 5 is a schematic diagram showing the connection of the baseboard testing interface of the present invention. As shown in the drawing, while being assembled, first the second baseboard 60 is plugged into the slot 50 with a 45° inclined angle. Then, a downward pressure is applied to clip and fix the second baseboard 60 on the baseboard 40 by using a plurality of elastic metal pins in the slot 50 and the elastic long-shaped fixed latch that are disposed on both sides of the slot 50, such that the second connection interface 65 on the second baseboard 60 is coupled with the plurality of contacts 451 on the baseboard 40. Then, the debugging adapter 70 is coupled to the second baseboard 60 through the signal connection line 67. Meanwhile, the signals can be transmitted between the baseboard 40 and the debugging adapter 70. The decoding chip 712 on the debugging adapter 70 is designed according to the Intel Low Pin Count Interface Specification. The signals on the baseboard 40 are decoded by the decoding chip 712 in order to generate a message code, which is subsequently displayed by the display device 711. Then, after looking up the message code from the Intel Error Code List, the developers and the customer service engineers can comprehend whether the baseboard 40 is out of order and decide whether to fix it or not. Accordingly, the present invention effectively resolves the disadvantages of the conventional PCI or ISA slot debugging adapter.

Figure 6:
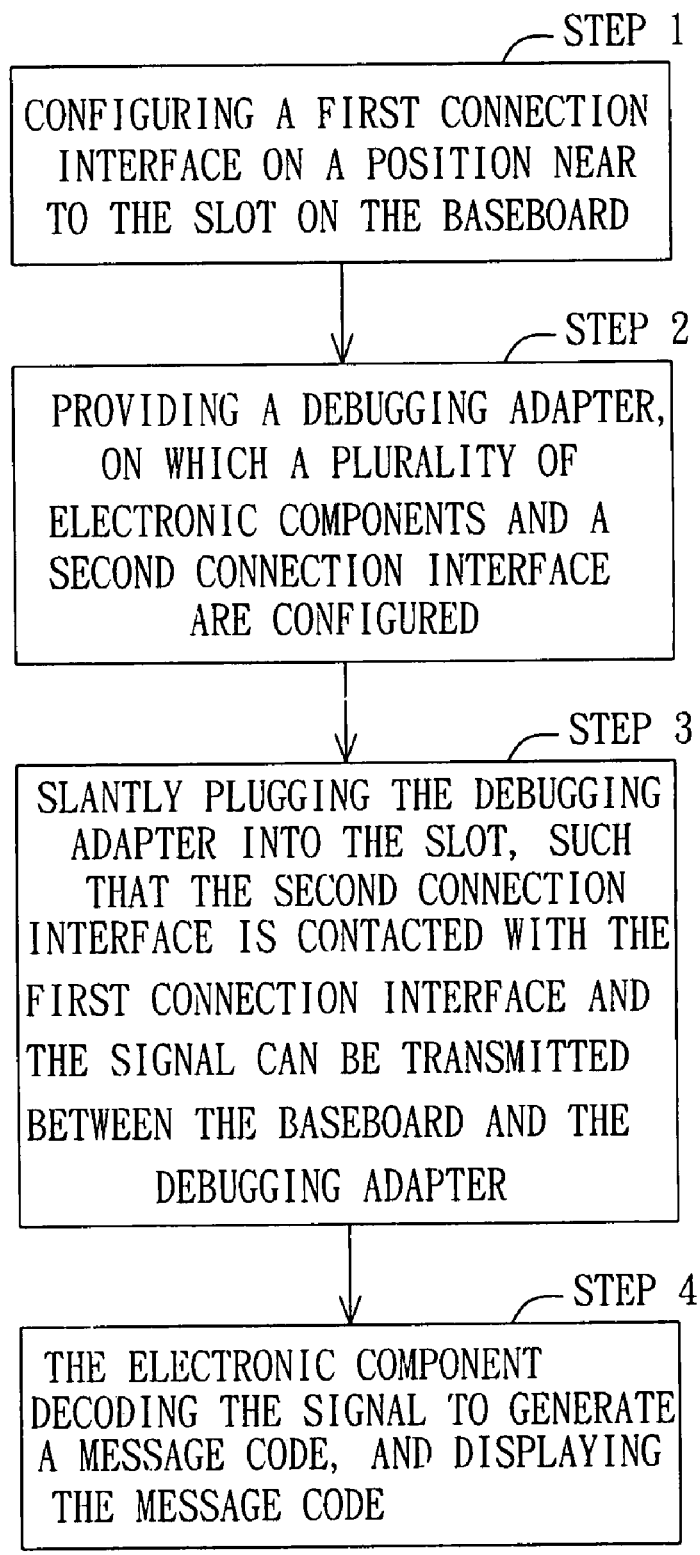
FIG. 6 is a flow chat showing a baseboard testing method according to yet another preferred embodiment of the present invention.

FIG. 6 is a flow chat showing a baseboard testing method according to yet another preferred embodiment of the present invention. As shown in the drawing, the present invention provides a baseboard testing method, and the baseboard 10 comprises a slot 20. The baseboard testing method comprises the following steps: configuring a first connection interface 15 on a position near to the slot 20 on the baseboard 10 (step 1); providing a debugging adapter 30, on which a plurality of electronic components 31 and a second connection interface 35 are configured (step 2); slantly plugging the debugging adapter 30 into the slot 20, such that the second connection interface 35 is contacted with the first connection interface 15 and the signal can be transmitted between the baseboard 10 and the debugging adapter 30 (step 3); and the electronic component 31 decoding the signal to generate a message code, and displaying the message code (step 4).

For the details of the baseboard 10, the first connection interface 15, and the slot 20 in step 1, please refer to the aforementioned description.

In step 2, the debugging adapter 30 comprises a plurality of second electronic components 31 and a second connection interface 35. Wherein, the second electronic components 31 further comprise a display device 312 and a decoding chip 311. The decoding chip 311 is coupled to the second connection interface 35 and the display device 312 and is designed based on the Intel Low Pin Count Interface Specification. Here, the display device 312 is, including but not necessarily limited to a seven-segment LED display.

In step 3, the debugging adapter is slantly plugged into the slot 20, such that the second connection interface 35 is contacted with the first connection interface 15 and the signals can be transmitted between the baseboard 10 and the debugging adapter 30. Here, the debugging adapter 30 is, including but not limited to be slantly plugged into the slot 20 with a 45° inclined angle.

In step 4, the electronic component 31 decodes the signal and generates a message code, and then displays the message code. Specifically, the decoding chip 311 on the debugging adapter 30 decodes the signal on the baseboard 10 and generates a message code, which is subsequently displayed by the display device 312. Afterwards, the message code is looked up from the Intel Error Code List, and the developers and the customer service engineers can comprehend whether the baseboard 10 is out of order and decide whether to fix it or not.

In summary, in the baseboard testing interface and the testing method provided by the present invention, the debugging adapter is fixed on the memory slot of the motherboard, and the desired electricity power and ground signal are provided by the memory slot, such that when it is required to repair the notebook computer, the maintenance staff only need to remove the cover of the memory slot. Accordingly, the present invention effectively resolves the disadvantages of the conventional computer baseboard's test and repair.

Although the invention has been described with reference to a particular embodiment thereof, it will be apparent to one of the ordinary skills in the art that modifications to the described embodiment may be made without departing from the spirit of the invention. Accordingly, the scope of the invention will be defined by the attached claims not by the above detailed description.

What is claimed is:

1. A baseboard testing interface, comprising:
   a baseboard having a plurality of first electronic components and a plurality of signal lines, wherein said plurality of first electronic components are coupled with said signal lines;
   a slot disposed on said baseboard for an external interface adapter to plug in and a debugging adapter to lock in, wherein said debugging adapter comprises a plurality of second electronic components, which comprise a display device and a decoding chip, wherein said decoding chip is coupled to said second connection interface and said display device, additionally said second connection interface is disposed on another side of said debugging adapter where said second electronic components are not configured, and said second connection interface is disposed opposite to said first connection interface for contacting with said first connection interface; and
   a first connection interface disposed on an area of the baseboard for connecting to a second connection interface on said debugging adapter, such that a signal can be transmitted between said baseboard and said debugging adapter through said first connection interface and said second connection interface, wherein said area is an area on said baseboard where said debugging adapter vertically maps onto said baseboard when said debugging adapter is binded to said baseboard, and said first connection interface is coupled with some of said first electronic components through said signal lines.

2. The baseboard testing interface of claim 1, wherein said first connection interface comprises a plurality of contacts, and said second connection interface is an elastic slice connector, which comprises a plurality of elastic slices, and the amount of said elastic slices is equal to the amount of said contacts.

3. The baseboard testing interface of claim 1, wherein said slot is a SO-DIMM memory adapter slot on said baseboard.

4. The baseboard testing interface of claim 1, wherein one side of said debugging adapter further comprises a plurality of pins, which obtain an electricity power and a ground signal from said baseboard through said slot.

5. The baseboard testing interface of claim 1, wherein a surface vertical to said baseboard comprises said first electronic components.

6. The baseboard testing interface of claim 1, wherein said external interface adapter may be a memory adapter or a display adapter, and said baseboard is a motherboard of a desktop computer or a motherboard of a notebook computer.

7. The baseboard testing interface of claim 1, wherein said debugging adapter further comprises a connector for connecting to a second baseboard.

8. A baseboard testing interface, comprising:
   a first baseboard having a plurality of first electronic components and a plurality of signal lines, wherein said first electronic components are coupled with said signal lines;
   a slot disposed on said baseboard for an external interface adapter to plug in and a second baseboard to lock in, wherein said second baseboard comprises a first connector and a second connector, said debugging adapter comprises a plurality of second electronic components and a third connector, and said second electronic components comprise a display device and a decoding chip, wherein said decoding chip is coupled to said third connector and said display device, additionally said second connection interface is disposed on another side of said second baseboard where said first connector and said second connector are not configured, and said second connection interface is disposed opposite to said first connection interface for contacting with said first connection interface; wherein said second baseboard is coupled to a debugging adapter through a signal connection line and
   a first connection interface disposed on an area of the first baseboard for connecting to a second connection interface on said second baseboard, such that a signal can be transmitted between said first baseboard and said second baseboard through said first connection interface and said second connection interface, and said signal can be transmitted to said debugging adapter through said signal connection line, wherein said area is an area on said first baseboard where said second baseboard vertically maps onto said first baseboard when said second baseboard is binded to said first baseboard, and said first connection interface is coupled with some of said first electronic components through said signal lines.

9. The baseboard testing interface of claim 8, wherein said first connection interface comprises a plurality of contacts, and said second connection interface is an elastic slice connector, which comprises a plurality of elastic slices, and the amount of said elastic slices is equal to the amount of said contacts.

10. The baseboard testing interface of claim 8, wherein said slot is a S0-DIMM memory adapter slot on said first baseboard.

11. The baseboard testing interface of claim 8, wherein said first connector is a SUPER I/O connector, and said second connector is coupled to said third connector through said signal connection line.

12. The baseboard testing interface of claim 8, wherein a surface vertical to said baseboard comprises said first electronic components.

13. The baseboard testing interface of claim 8, wherein said second baseboard further comprises a fourth connector for connecting to a keyboard.

14. A baseboard testing method for testing a baseboard with a slot, comprising:
  configuring a first connection interface on a position near to said slot on said baseboard;
  providing a debugging adapter, wherein a plurality of electronic components and a second connection interface are configured on said debugging adapter, wherein said plurality of second electronic components on said debugging adapter comprises a display device and a decoding chip, said decoding chip is coupled to said second connection interface and said display device, and said display device is a seven-segment LED display;
  slantly plugging said debugging adapter into said slot, such that said second connection interface is contacted with said first connection interface and a signal can be transmitted between said baseboard and said debugging adapter; and
  said electronic component decoding said signal to generate a message code, and displaying said message code.

15. The baseboard testing method of claim 14, wherein said first connection interface comprises a plurality of contacts, and said second connection interface is an elastic slice connector, which comprises a plurality of elastic slices, and the amount of said elastic slices is equal to the amount of said contacts.

16. The baseboard testing method of claim 14, wherein there may be ten contacts to respectively represent the PCLK_PCI_SIO, LPC_AD0, LPC_AD1, LPC_AD2, LPC_AD3, LPC_FRAME#, PCIRST#, LPC_DRQ1#/E51_RXD, SERIRQ/E51_RDX, and +3VALW signals.

17. The baseboard testing method of claim 14, wherein said slot is a S0-DIMM memory adapter slot on said baseboard.

18. The baseboard testing method of claim 14, wherein said baseboard is a motherboard of a desktop computer or a motherboard of a notebook computer.

19. The baseboard testing method of claim 14, wherein said debugging adapter is slantly plugged into said slot with a 45° inclined angle.

* * * * *